US009233591B2

(12) United States Patent
Begenau et al.

(10) Patent No.: US 9,233,591 B2
(45) Date of Patent: Jan. 12, 2016

(54) FIBER COMPOSITE COMPONENT AND METHOD FOR PRODUCING A FIBER COMPOSITE COMPONENT

(71) Applicant: Dr. Ing. h.c. F. Porsche Aktiengesellschaft, Stuttgart (DE)

(72) Inventors: Eric Begenau, Stuttgart (DE); Boris Schmidt, Karlsruhe (DE); Gustav Rapp, Murr (DE)

(73) Assignee: Dr. Ing. h.g. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/522,027

(22) Filed: Oct. 23, 2014

(65) Prior Publication Data
US 2015/0115560 A1 Apr. 30, 2015

(30) Foreign Application Priority Data

Oct. 24, 2013 (DE) .......................... 10 2013 111 702

(51) Int. Cl.
*B60G 21/055* (2006.01)
*B29C 70/54* (2006.01)
*B29C 70/24* (2006.01)
*B29K 307/04* (2006.01)

(52) U.S. Cl.
CPC .............. *B60G 21/055* (2013.01); *B29C 70/24* (2013.01); *B29C 70/54* (2013.01); *B29K 2307/04* (2013.01); *B60G 2206/427* (2013.01); *B60G 2206/7101* (2013.01)

(58) Field of Classification Search
CPC ...................... B60G 21/055; B60G 2206/7101; B29C 70/54; B29K 2307/04
See application file for complete search history.

(56) References Cited

U.S. PATENT DOCUMENTS

| 3,638,455 | A | * | 2/1972 | Francois | ................... F16D 3/06 464/181 |
|---|---|---|---|---|---|
| 4,178,713 | A | | 12/1979 | Higuchi | |
| 5,048,441 | A | | 9/1991 | Quigley | |
| 2003/0175455 | A1 | | 9/2003 | Erb | |
| 2013/0273286 | A1 | * | 10/2013 | Luo | ........................ C08L 81/04 428/36.91 |

FOREIGN PATENT DOCUMENTS

| DE | 3910641 | 10/1990 |
|---|---|---|
| DE | 69033726 | 6/2002 |
| DE | 10205965 | 9/2003 |

OTHER PUBLICATIONS

German Search Report mailed Mar. 21, 2014 for corresponding German Patent Application No. 10 2013 111 702.3, with partial translation.

* cited by examiner

*Primary Examiner* — Faye M Fleming
(74) *Attorney, Agent, or Firm* — RatnerPrestia

(57) ABSTRACT

A fiber composite component, in particular a torsion-bar stabilizer for a motor vehicle, having an elongate main body which has a plurality of tubular layers which are each formed from fibrous threads and casting resin, wherein the tubular layers are arranged in one another in the radial direction of the main body, and wherein the fibrous threads f the different layers are each oriented at different angles relative to a longitudinal direction of the main body, wherein the fibrous threads are braided together in order to form the different layers.

14 Claims, 2 Drawing Sheets

FIBER COMPOSITE COMPONENT AND METHOD FOR PRODUCING A FIBER COMPOSITE COMPONENT

CROSS-REFERENCE TO RELATED APPLICATIONS

This application claims priority under 35 U.S.C. §119 of German Patent Application No. 10 2013 111 702.3, filed Oct. 24, 2013, which is incorporated by reference herein in its entirety.

FIELD OF INVENTION

The present invention relates to a fiber composite component, in particular a torsion-bar stabilizer for a motor vehicle, having an elongate main body which has a plurality of tubular layers which are each formed from fibrous threads and casting resin, wherein the tubular layers are arranged in one another in the radial direction of the main body, and wherein fibrous threads of the different layers are each oriented at different angles relative to a longitudinal direction of the main body.

The present invention furthermore relates to a method for producing a fiber composite component, in particular a torsion-bar stabilizer for a motor vehicle, wherein two elongate tubular layers made of fibrous threads are arranged in one another in the radial direction and the tubular layers are cast with casting resin.

Fiber composite components of this type are generally used to absorb transverse forces and torsional forces for example in a motor vehicle.

BACKGROUND OF THE INVENTION

It is generally known to manufacture components in a motor vehicle and in particular load-bearing parts in a motor vehicle from carbon fiber composite materials in order to reduce the weight of the motor vehicle. The carbon fiber threads are in this case arranged in different directions of the component and connected together by way of casting resin in order to produce a stable and flexurally and torsionally rigid component. In this case, a maximum spring constant of the component occurs at an angle of the fibrous threads of 45° relative to a longitudinal direction of the component.

The carbon fiber composite components are usually constructed in a plurality of layers in order to increase the flexural rigidity of the components. A general disadvantage with such fiber composite components that are constructed in a layer-wise manner is that the different layers move relative to one another under torsional loading and therefore delamination can occur between the individual layers with the result that a service life of such fiber composite components is limited.

In order to improve the service life of a torsion tube for a motor vehicle, DE 39 10 641 A1, which is incorporated by reference herein, proposes combining a plurality of plies of fibers into bundles and arranging the fibers in the different layers at different angles relative to a longitudinal direction of the component. A disadvantage here is that the fiber bundles are wound and as a result the component has limited torsional rigidity and can absorb only small bending forces.

SUMMARY

It is therefore the object of the present invention to provide an improved fiber composite component and a method for producing a fiber composite component which has improved torsional and flexural rigidity while at the same time having a longer service life.

In the case of the fiber composite component mentioned at the beginning, this object is achieved in that the fibrous threads are braided together in order to form the different layers.

In the case of the method mentioned at the beginning, this object is achieved by the steps of braiding a first elongate tubular layer made of fibrous threads, braiding a second separate elongate tubular layer made of fibrous threads, wherein the second tubular layer is arranged in the radial direction around the first tubular layer, and wherein the fibrous threads of the first and of the second tubular layer are braided at different angles relative to a longitudinal direction of the tubular layer.

Since the fibrous threads are braided, the stability of the individual tubular layers can generally be increased and since the fibrous threads are braided in a manner oriented at different angles relative to the longitudinal direction, a relative torsional movement of the individual layers with respect to one another can be prevented or reduced, such that shear stress between the individual layers is minimized and as a result the service life of the fiber composite component is increased.

The object of the present invention is thus fully achieved.

In a particular embodiment, the different layers form separate braided bodies.

As a result, the different layers can be produced with little technical effort.

It is furthermore preferred for the layers to be connected firmly together by means of the casting resin.

As a result, the rigidity of the component can be further increased since the individual layers are connected firmly together.

It is furthermore preferred for the angle of the fibrous threads of the different layers to decrease from an inner layer to an outer layer.

As a result, the torsional rigidity of the individual layers can be adapted to the particular radius, and so all the layers absorb identical energy and as a result shear stresses between the individual layers are minimized.

It is furthermore preferred for the individual layers to additionally have longitudinal threads which are oriented parallel to the longitudinal direction. In this case, a triaxial braid which has fibrous threads in three directions can be provided overall.

As a result, the flexural rigidity of the component can be increased in addition to the torsional rigidity.

It is furthermore preferred for the longitudinal threads to be adhesively bonded to the fibrous threads of the particular layers.

As a result, the longitudinal threads can be added to the tubular layers with little technical effort.

It is furthermore preferred for the longitudinal threads to be braided with the fibrous threads of the particular layers.

As a result, the rigidity of the component can generally be further increased.

It is furthermore preferred for the number of longitudinal threads in the different layers to vary.

As a result, the energy absorption of the individual layers in the event of bending can be adapted such that the shear stress between the individual layers is minimized in the event of bending.

It is furthermore preferred for the angle of the fibrous threads to vary from 10° to 80°, preferably 30° to 45°.

As a result, the torsional rigidity and at the same time the flexural rigidity of the different layers can be optimized.

Overall, provision can thus be made of a fiber composite component and a method for producing such a fiber composite component which has improved torsional rigidity and improved flexural rigidity and at the same time an improved service life, since the fibrous threads are braided together and are oriented at different angles in the different layers, wherein the improved flexural rigidity is improved in particular by the additional longitudinal threads or filler threads parallel to a longitudinal direction of the main body.

Preferably, the fibrous threads, the longitudinal threads or the filler threads are in the form of carbon fiber threads and form a carbon fiber composite material by casting with casting resin.

It goes without saying that the abovementioned features and those yet to be explained below can be used not only in the combination specified in each case, but also in other combinations or on their own, without departing from the scope of the present invention.

BRIEF DESCRIPTION OF THE DRAWINGS

Exemplary embodiments of the invention are illustrated in the drawing and explained in more detail in the following description. In the drawing.

DETAILED DESCRIPTION

Figure 1:
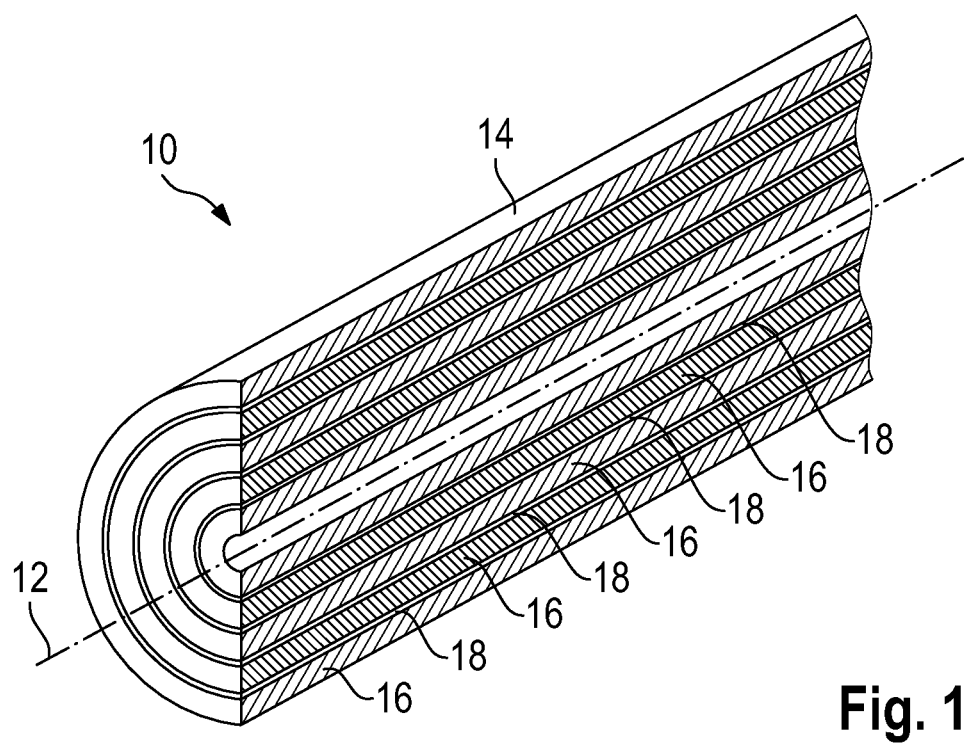
FIG. 1 shows a schematic sectional view of a carbon fiber composite component having a plurality of carbon fiber layers.

In FIG. 1, a carbon fiber composite component is schematically illustrated and denoted generally 10. The carbon fiber composite component 10 is in the form of a cylindrical component and can serve in particular as a torsion-bar stabilizer for a chassis of a motor vehicle. The carbon fiber composite component 10 is formed in a cylindrical manner and has a longitudinal axis 12. The carbon fiber composite component 10 has generally a main body 14 which is formed from a plurality of cylindrical or tubular carbon fiber layers 16. The layers 16 are arranged in one another in the radial direction of the main body 14 and are braided as separate braided bodies made of carbon fiber threads which are cast with casting resin. The layers 16 are separated from one another in the radial direction by a spacing 18, wherein the layers 16 are connected firmly together by the casting resin and the spacing 18 is filled with the casting resin.

The layers 16 are in the form of a triaxial carbon fiber braid, wherein two fiber directions of the carbon fiber threads are braided transversely or obliquely with respect to the longitudinal axis 12 and a third fiber direction of the carbon fiber threads is braided parallel to the longitudinal axis 12, forming the filler threads as they are known. The individual layers 16 have in this case different braiding angles of the obliquely extending carbon fiber threads relative to the longitudinal axis 12. The braiding angle between the carbon fiber threads and the longitudinal axis 12 is between about 42° and 45° at the innermost layer. The braiding angle between the carbon fiber threads and the longitudinal axis 12 decreases outwardly from layer to layer, wherein the braiding angle at the outermost layer 16 is about 30° and preferably 32°.

In the event of torsional movements of the carbon fiber composite component 10, the outer layers 16 move to a greater extent than the inner layers 16 on account of their geometry and their larger radius. This usually results in a relative movement of the layers 16 with respect to one another. On account of the variation of the braiding angle of the individual layers 16, the outer layers 16 are less torsionally rigid on account of the smaller braiding angle but have in return greater flexural rigidity. The innermost plies 16 afford more torsional rigidity and less flexural rigidity on account of the greater braiding angle. As a result of the outer layer being less torsionally rigid, the layers 16 can all absorb the same amount of energy, and so shear stresses between the plies 16 are minimized and delamination in the region of the spacing 18 is prevented.

As a result of the layer structure of the carbon fiber composite component 10, the diameter of the carbon fiber composite component 10 can be reduced considerably, since the torsional rigidity can be increased by the layer structure.

Thus, in general, the carbon fiber composite component 10 can have both high torsional rigidity and high flexural rigidity and furthermore has a long service life, since the shear stresses between the individual layers 16 are reduced.

The carbon fiber composite component 10 can serve generally as a connecting component for absorbing torsional and flexural movements, for example as a stabilizer or as a torsion bar or Cardan shaft.

FIG. 2a to e schematically illustrate a structure of the fibrous threads in the different layers 16.

In general, the braided bodies of the individual layers 16 of the carbon fiber composite component 10 have braiding threads 22 and filler threads 24. The braiding threads 22 are oriented or braided obliquely with respect to the longitudinal axis 12 and each have the same braiding angle α relative to the longitudinal axis 12 in both directions. The filler threads 24 are arranged parallel to the longitudinal axis 12 and can be both braided with the braiding threads 22 and only adhesively bonded to the braiding threads 22. The braiding angle a generally becomes smaller from the inside to the outside of the individual layers 16, that is to say from layer to layer. The braiding angle α is determined or set by how quickly a braid core is guided through a centrally arranged braid eye during braiding.

Figure 2A:
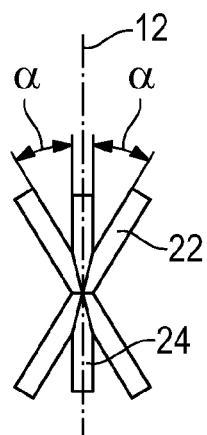
FIG. 2a shows a schematic illustration of a braid ply structure of an outermost layer of the carbon fiber composite component.
Figure 2B:
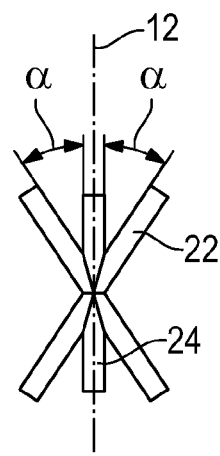
FIG. 2b shows a schematic illustration of a braid ply structure of an inner layer of the carbon fiber composite component.
Figure 2C:
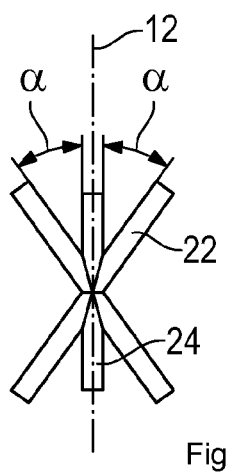
FIG. 2c shows a schematic illustration of a braid ply structure of an inner layer of the carbon fiber composite component.
Figure 2D:
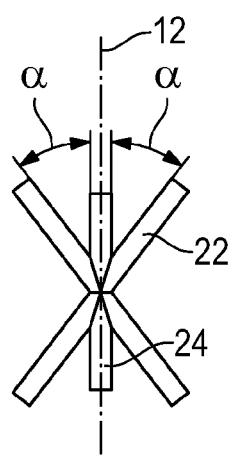
FIG. 2d shows a schematic illustration of a braid ply structure of an inner layer of the carbon fiber composite component.
Figure 2E:
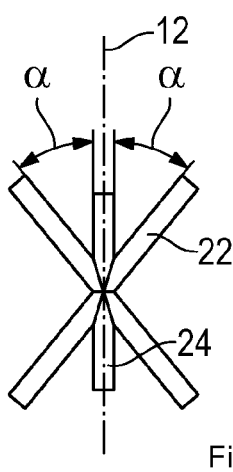
FIG. 2e shows a schematic illustration of a braid ply structure of an innermost layer of the carbon fiber composite component.

FIG. 2a schematically illustrates a braid ply structure for an outermost of the layers 16, wherein the braiding angle α is 32°. As a result, this layer has high flexural rigidity, whereas the torsional rigidity of this layer is less. FIG. 2e schematically illustrates a braid ply structure for the innermost of the layers 16. The braiding angle α for the innermost layer is in this case 42°, as a result of which the torsional rigidity of this layer 16 is high, but the flexural rigidity is less. The layers 16 between the innermost and the outermost layer are illustrated in FIGS. 2b to 2d, wherein the braiding angle increases incrementally and is 34° in FIG. 2b, 36° in FIGS. 2c, and 39° in FIG. 2d.

During the production of the carbon fiber composite component 10, the individual layers 16 are braided simultaneously or in succession, wherein the filler threads 24 can simply be adhesively bonded to the braiding threads, that is to say be wound, or be braided together with the braiding threads 22. The filler threads 24 increase the flexural rigidity of the carbon fiber composite component 10 and of the individual layers 16.

In a particular embodiment, the number of filler threads 24 in the individual layers 16 can be varied, such that the flexural rigidity of the individual layers 16 can be adapted to the particular geometry, in order to minimize shear stress between the layers 16 even in, the event of bending loads.

Following the braiding operation, the main body 14 is cast with the casting resin in order to increase the stability of the individual braided bodies. In this case, the individual layers 16 are spaced apart from one another and connected firmly together by means of the casting resin. Alternatively or in addition, the carbon fiber threads may also already be preimpregnated.

The invention claimed is:

1. A fiber composite component for a motor vehicle, having:
    an elongate main body which has a plurality of tubular layers which are each formed from fibrous threads and casting resin, wherein the tubular layers are arranged in one another in the radial direction of the main body, and wherein the fibrous threads of the different layers are each oriented at different angles relative to a longitudinal direction of the main body, wherein the fibrous threads are braided together in order to form the different layers.

2. The carbon fiber composite component as claimed in claim 1, wherein the different layers are formed as separate braided bodies.

3. The carbon fiber composite component as claimed in claim 1, wherein the layers are connected firmly together by means of the casting resin.

4. The carbon fiber composite component as claimed in claim 1, wherein the angle of the fibrous threads of the different layers decreases from inside to outside.

5. The carbon fiber composite component as claimed in claim 1, wherein the different layers additionally have longitudinal threads which are oriented parallel to the longitudinal direction.

6. The carbon fiber composite component as claimed in claim 5, wherein in each layer the longitudinal threads are adhesively bonded to the fibrous threads of the layer.

7. The carbon fiber composite component as claimed in claim 5, wherein in each layer the longitudinal threads are braided with the fibrous threads of the layer.

8. The carbon fiber composite component as claimed in claim 5, wherein a number of longitudinal threads in the different layers varies.

9. The carbon fiber composite component as claimed in claim 1, wherein the angle varies from 10° to 80°.

10. The carbon fiber composite component as claimed in claim 1, wherein the fibrous threads and the longitudinal threads are in the form of carbon fiber threads and in that a carbon fiber composite material is formed by casting with casting resin.

11. A method for producing a fiber composite component for a motor vehicle, having the steps of:
    braiding a first elongate tubular layer made of fibrous threads,
    braiding a second separate elongate tubular layer made of fibrous threads, wherein the second tubular layer is arranged in the radial direction around the first tubular layer, wherein the fibrous threads of the first and of the second tubular layer are braided at different angles relative to a longitudinal direction of the tubular layers, and
    casting the tubular layers with casting resin.

12. The carbon fiber composite component as claimed in claim 1, comprising a torsion bar stabilizer.

13. The carbon fiber composite component as claimed in claim 9, wherein the angle varies from 30° to 45°.

14. The method as claimed in claim 11, wherein the carbon fiber composite component comprises a torsion bar stabilizer.

* * * * *